(12) United States Patent
Iihoshi et al.

(10) Patent No.: US 12,572,872 B2
(45) Date of Patent: Mar. 10, 2026

(54) MINE MANAGEMENT SYSTEM

(71) Applicant: Hitachi Construction Machinery Co., Ltd., Tokyo (JP)

(72) Inventors: Yoichi Iihoshi, Tokyo (JP); Hiroshi Tsukui, Tsuchiura (JP); Kouichirou Ejiri, Tsuchiura (JP); Kenichi Ajima, Tsuchiura (JP); Kenji Mizutani, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 270 days.

(21) Appl. No.: 18/024,673

(22) PCT Filed: Jan. 20, 2022

(86) PCT No.: PCT/JP2022/002015
§ 371 (c)(1),
(2) Date: Mar. 3, 2023

(87) PCT Pub. No.: WO2022/168621
PCT Pub. Date: Aug. 11, 2022

(65) Prior Publication Data
US 2023/0316205 A1    Oct. 5, 2023

(30) Foreign Application Priority Data
Feb. 2, 2021    (JP) ................................. 2021-015132

(51) Int. Cl.
*G06Q 10/06*        (2023.01)
*G06Q 10/0639*      (2023.01)
*G06Q 50/02*        (2012.01)
(52) U.S. Cl.
CPC ......... *G06Q 10/0639* (2013.01); *G06Q 50/02* (2013.01)

(58) Field of Classification Search
CPC ...................................................... G06Q 10/06
See application file for complete search history.

(56) References Cited

U.S. PATENT DOCUMENTS

| | | | | |
|---|---|---|---|---|
| 2012/0127924 | A1* | 5/2012 | Bandyopadhyay | ...... G08G 1/16 370/328 |
| 2014/0244098 | A1 | 8/2014 | Ueda et al. | |

(Continued)

FOREIGN PATENT DOCUMENTS

| | | |
|---|---|---|
| JP | 5596661 B2 | 9/2014 |
| JP | 2014-238875 A | 12/2014 |

(Continued)

OTHER PUBLICATIONS

Erik Jakobsson, Data-driven Condition Monitoring in Mining Vehicles, Department of Electrical Engineering, Linköping University, SE-581 33 Linköping, Sweden, Linköping 2019. (Year: 2019).*

(Continued)

*Primary Examiner* — Kurtis Gills
(74) *Attorney, Agent, or Firm* — Crowell & Moring LLP

(57)                 ABSTRACT
An object of the invention of the present application is to provide a mine management system capable of accurately maintaining and managing the productivity of a mine. To achieve the object, a processing device is configured to generate mesh information of travel cycles in which mine vehicles move from a location in which earth is dumped to a location where the mine vehicles are loaded with a load and then move again to the earth removing location, on the basis of positional information of the mine vehicles, compare the mesh information of the travel cycles with mesh information of routes stored in a storage device to classify the travel cycles to any one of the routes, compute productivity indexes of the travel cycles on the basis of working information of the mine vehicles, compare the productivity indexes of the travel cycles with a productivity reference (Continued)

value of the one of the routes to detect a productivity decline of the one of the routes, and output the detected productivity decline to a display terminal device.

14 Claims, 19 Drawing Sheets

(56) References Cited

U.S. PATENT DOCUMENTS

| | | | |
|---|---|---|---|
| 2016/0247395 A1 | 8/2016 | Sugihara et al. | |
| 2017/0285658 A1* | 10/2017 | Sakai | G05D 1/0278 |
| 2017/0337808 A1* | 11/2017 | Lahdelma | G05D 1/0276 |
| 2018/0246523 A1* | 8/2018 | Ogihara | G05D 1/0278 |
| 2019/0072403 A1 | 3/2019 | Sakai | |
| 2019/0287407 A1* | 9/2019 | Branscombe | G08G 1/161 |
| 2021/0394659 A1* | 12/2021 | Uetake | E21F 13/025 |
| 2022/0162941 A1* | 5/2022 | Morrison | G05D 1/617 |

FOREIGN PATENT DOCUMENTS

| | | | | |
|---|---|---|---|---|
| JP | 2019-200462 A | 11/2019 | | |
| WO | WO-2010122570 A1 * | 10/2010 | | E21F 17/18 |
| WO | WO 2015/029229 A1 | 3/2015 | | |
| WO | WO 2017/130418 A1 | 8/2017 | | |

OTHER PUBLICATIONS

Choi, Y. et al, "Multi-criteria evaluation and least-cost path analysis for optimal haulage routing of dump trucks in large scale open-pit mines", International Journal of Geographical Information Science, Nov.-Dec. 2009, pp. 1541-1567, vol. 23, No. 12 (28 pages).

International Search Report (PCT/ISA/210) issued in PCT Application No. PCT/JP2022/002015 dated Apr. 19, 2022 with English translation (four (4) pages).

Japanese-language Written Opinion (PCT/ISA/237) issued in PCT Application No. PCT/JP2022/002015 dated Apr. 19, 2022 (five (5) pages).

International Preliminary Report on Patentability (PCT/IB338 & PCT/IB/373) issued in PCT Application No. PCT/JP2022/002015 dated Aug. 17, 2023, including English translation of document C2 (Japanese-language Written Opinion (PCT/ISA/237), filed on Mar. 3, 2022) (7 pages).

* cited by examiner

FIG. 2

DEGREE OF SIMILARITY 1 = (R&C)/R
DEGREE OF SIMILARITY 2 = ((R+R')&C)/C

EXAMPLE OF DRIVER GUIDANCE MANAGEMENET DASHBOARD

EXAMPLE OF DRIVING PLAN MANAGEMENT DASHBOARD

EXAMPLE OF ROAD MANAGEMENT DASHBOARD

EXAMPLE OF VEHICLE MANAGEMENT DASHBOARD

FIG. 19

| ROUTE ID | TRAVEL RATIO | SETTING A | SETTING B | SETTING C |
|---|---|---|---|---|
| 1 | 0.1 | 10 | 9.5 | 10.5 |
| 2 | 0.05 | 12 | 11 | 11.1 |
| 3 | 0.3 | 10.4 | 10 | 10.4 |
| 4 | 0.25 | 10.4 | 9 | 10.3 |
| . . . | . . . | . . . | . . . | . . . |
| TOTAL | 0.7 | 7.32 | 6.75 | 7.3 |

MINE MANAGEMENT SYSTEM

TECHNICAL FIELD

The present invention relates to a system that manages the productivity of a mine.

BACKGROUND ART

In recent years, there have been disclosed a system for collecting and analyzing data of mine vehicles and computing various management indexes on the basis of routes along which the mine vehicles move from a location where earth is dumped to a location where the mine vehicles are loaded with a load and then move again to the earth removing location (Patent Document 1), and a system for computing various management indexes on the basis of working conditions in particular zones on routes (Patent Document 2). Specifically, Patent Document 1 discloses a system and a method for computing, in association with routes, a road index about road surface irregularities, a fuel economy index about traveling vehicles, an improvement index about traveling speeds, an inspection index about vehicles, a fatigue index about drivers, a changing index about transportation routes, an improvement index about loadage, etc. Patent Document 2 discloses a system and a method for computing indexes about the production efficiencies of mine vehicles, such as fuel consumption rates or load transportation rates per unit time, in particular zones where adjacent links on routes satisfy predetermined conditions.

PRIOR ART DOCUMENT

Patent Documents

Patent Document 1: JP5596661B2
Patent Document 2: Republished WO2015/029229A1

SUMMARY OF THE INVENTION

Problems to be Solved by the Invention

However, according to Patent Documents 1 and 2, errors of GPS sensors for specifying the positions of mine vehicles or deviations from travel paths for avoiding other vehicles and rough terrain have not been taken into account. According to Patent Document 1, therefore, management indexes tend to deviate due to routes that are classified as different from original routes because of GPS sensor errors or travel path deviations. According to Patent Document 2, moreover, the frequency at which management indexes are computed is likely to be lowered as zones where management indexes are computed are limited to locations that are straight, have small gradients, and are not points of intersection. According to the conventional methods, in addition, the productivity of a mine and management indexes provided by the system are not directly linked to each other, making it difficult to maintain and improve the productivity of the mine.

The present invention has been made in view of the above problems. It is an object of the present invention to provide a mine management system capable of accurately maintaining and managing the productivity of a mine.

Means for Solving the Problems

In order to achieve the above object, there is provided in accordance with the present invention a mine management system for managing productivity of a mine on the basis of positional information and working information of mine vehicles, the mine management including a processing device that has a computing function, a display terminal device that is capable of displaying computed results from the processing device, and a storage device that stores mesh information of a plurality of routes around the mine along which the mine vehicles move from a location where earth is dumped to a location where the mine vehicles are loaded with a load and then move again to the earth removing location and also stores productivity reference values of the respective routes. The processing device is configured to generate mesh information of travel cycles in which the mine vehicles, after having dumped earth, move to a location where the mine vehicles are loaded with a load and then move again to an earth removing location, on the basis of the positional information of the mine vehicles, compare the mesh information of the travel cycles with the mesh information of the routes stored in the storage device to classify the travel cycles to any one of the routes, compute productivity indexes of the travel cycles on the basis of the working information of the mine vehicles, compare the productivity indexes of the travel cycles with the productivity reference value of the one of the routes to detect a productivity decline of the one of the routes, and output the detected productivity decline to the display terminal device.

According to the present invention thus arranged, by comparing the mesh information of the travel cycles obtained from the working data with the mesh information of the routes stored in the storage device, it is possible to classify the travel cycles accurately to any one of the routes. Moreover, by comparing the productivity indexes of the travel cycles with the productivity reference value of the relevant route, it is possible to accurately detect a productivity decline of the travel cycles. In this manner, the productivity of the mine can accurately be maintained and managed.

Advantages of the Invention

The mine management system according to the present invention is capable of accurately maintaining and improving the productivity of a mine.

BRIEF DESCRIPTION OF THE DRAWINGS

FIG. 2 is a diagram illustrating an example of computation blocks of a processing device.

FIG. 19 is a diagram illustrating an example of a comparison table of productivity indexes that are used in selecting settings of mine vehicles.

MODES FOR CARRYING OUT THE INVENTION

Embodiments of the present invention will be described hereinbelow with reference to the drawings.

First Embodiment

A mine management system according to a first embodiment of the present invention will be described below with reference to FIGS. 1 through 11.

Figure 1:
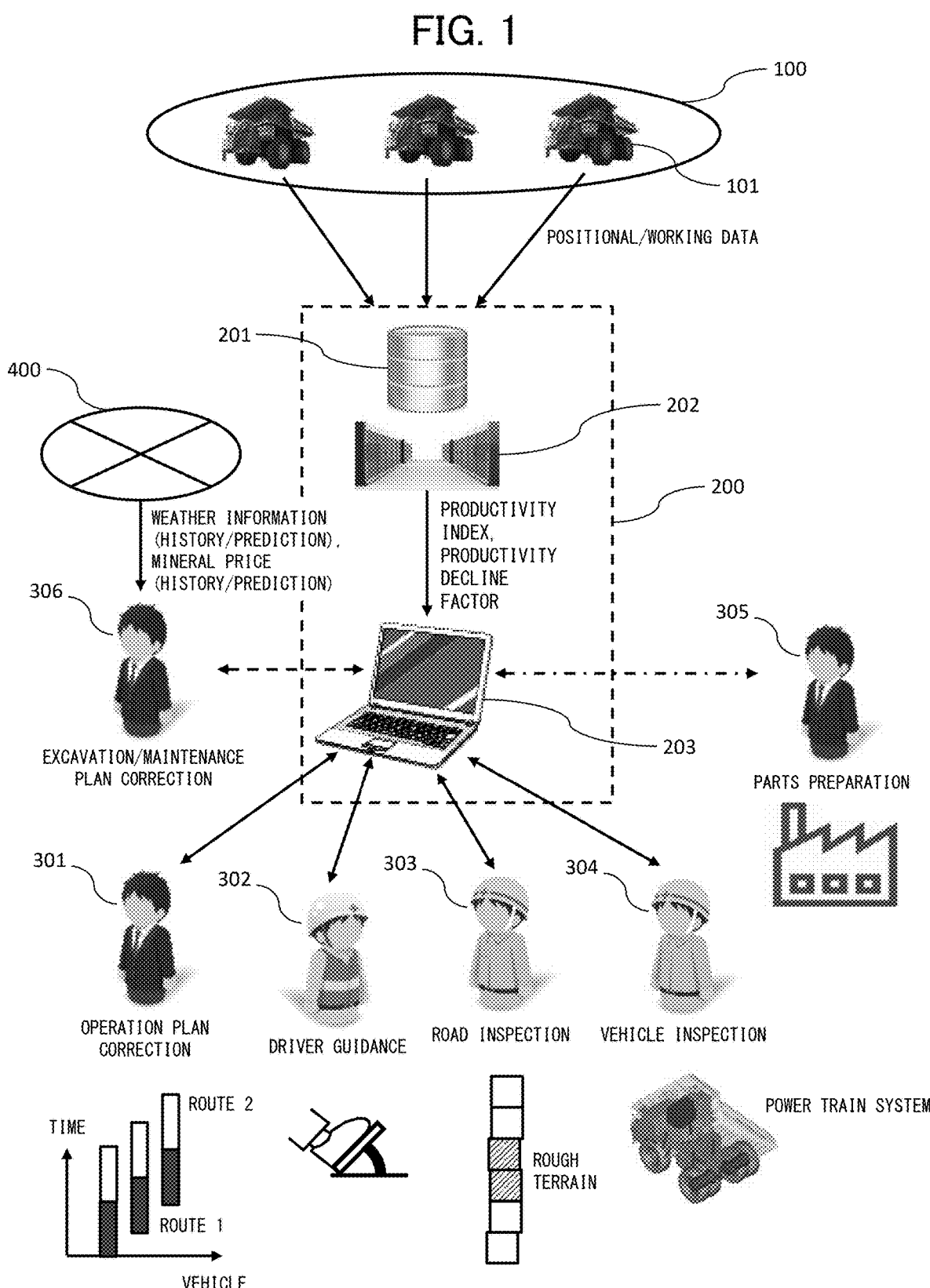
FIG. 1 is a diagram illustrating an overview of a mine management system.

FIG. 1 is a diagram illustrating an overview of the mine management system according to the present embodiment. The mine management system, denoted by 200, includes a storage device 201 (e.g., a database) for collecting positional information and working information of each vehicle from a plurality of mine vehicles 101 traveling in a mine area 100 that are managed all together, a processing device 202 (e.g., a server) for computing productivity indexes of the mine on the basis of the positional information and working information of the mine vehicles 101 to determine productivity decline factors, and a display terminal device 203 (e.g., a laptop computer or a portable terminal having display means) for displaying the productivity indexes and the productivity decline factors. In the storage device 201, there are registered route IDs representing identification information of a plurality of routes around the mine along which the mine vehicles 101 move from a location where earth is dumped to a location where the mine vehicles 101 are loaded with a load and then move again to the earth removing location, and productivity reference values of the respective routes. Although working data of the mine vehicles 101 should desirably be transmitted successively to the mine management system 200, they may not necessarily be transmitted successively in view of communication conditions and communication costs. According to the present embodiment, the processing device 202 starts to process working data after it has buffered a certain amount of working data. It is assumed that, for example, a travelling action of a mine vehicle 101 from a location where earth is dumped to a location where the mine vehicle 101 is loaded with a load and then back to the earth removing location is referred to as one cycle, and the certain amount of working data may be determined according to a period of time corresponding to the longest cycle in the past or an amount of data corresponding to the longest cycle.

A user of the mine management system 200 can maintain and manage the productivity of the mine by detecting at an early stage a decline in the productivity of the mine with use of information (dashboard information) displayed on the display terminal device 203 and taking countermeasures on the basis of factors involved in the decline in the productivity. For example, a mine operation administrator 301 can correct an operation plan for the mine vehicles 101 with use of the dashboard information. A driver guidance instructor 302 can find a driver whose driving is to be improved from the dashboard information and perform driver guidance. A road maintenance worker 303 can quickly identify a road spot that leads to a productivity decline from the dashboard information and repair the identified road spot. A vehicle maintenance worker 304 can detect a malfunction of a power train part from the dashboard information and prompt a parts dealer 305 to prepare a necessary part in advance. The dashboard information may be combined with weather information (history/prediction) and mineral prices (history/prediction) acquired via the Internet 400 to allow a person 306 in charge of excavation work to correct an excavation/maintenance plan or to allow the parts dealer 305 to uniquely predict a part fault using the dashboard information for thereby preparing a part beforehand. The display terminal device 203 may display dashboard information not only in a dashboard format but also in a report format or a mail format.

Figure 2:
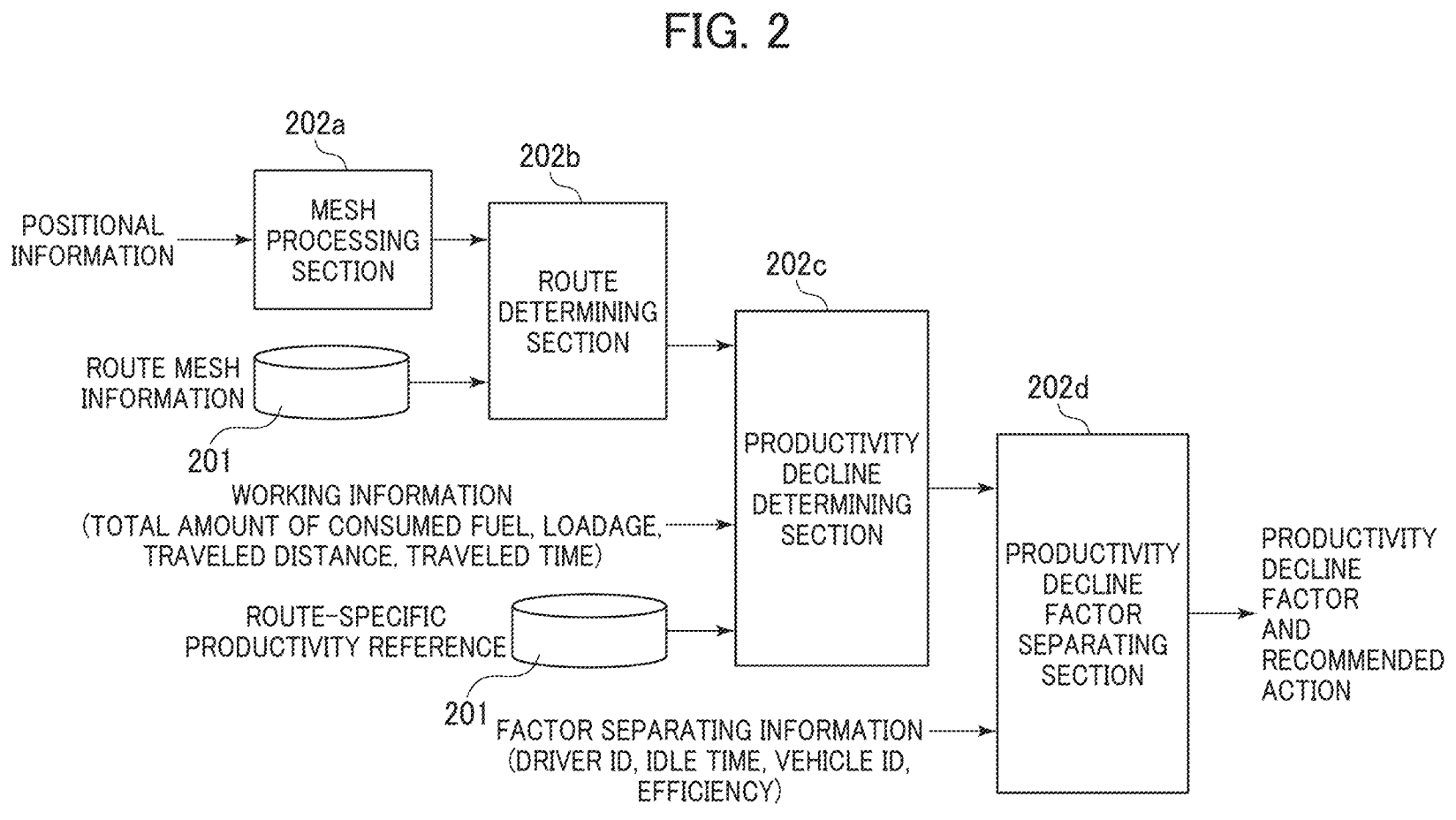

FIG. 2 illustrates an example of computation blocks of the processing device 202. As illustrated in FIG. 2, the processing device 202 has computation blocks including a mesh processing section 202a, a route determining section 202b, a productivity decline determining section 202c, and a productivity decline factor separating section 202d.

The mesh processing section 202a computes mesh information from positional information obtained from GPS sensors or the like installed on the mine vehicles 101. The route determining section 202b determines routes by comparing a mesh group in one cycle with mesh groups assigned to the route IDs registered in the database 201.

Figure 3:
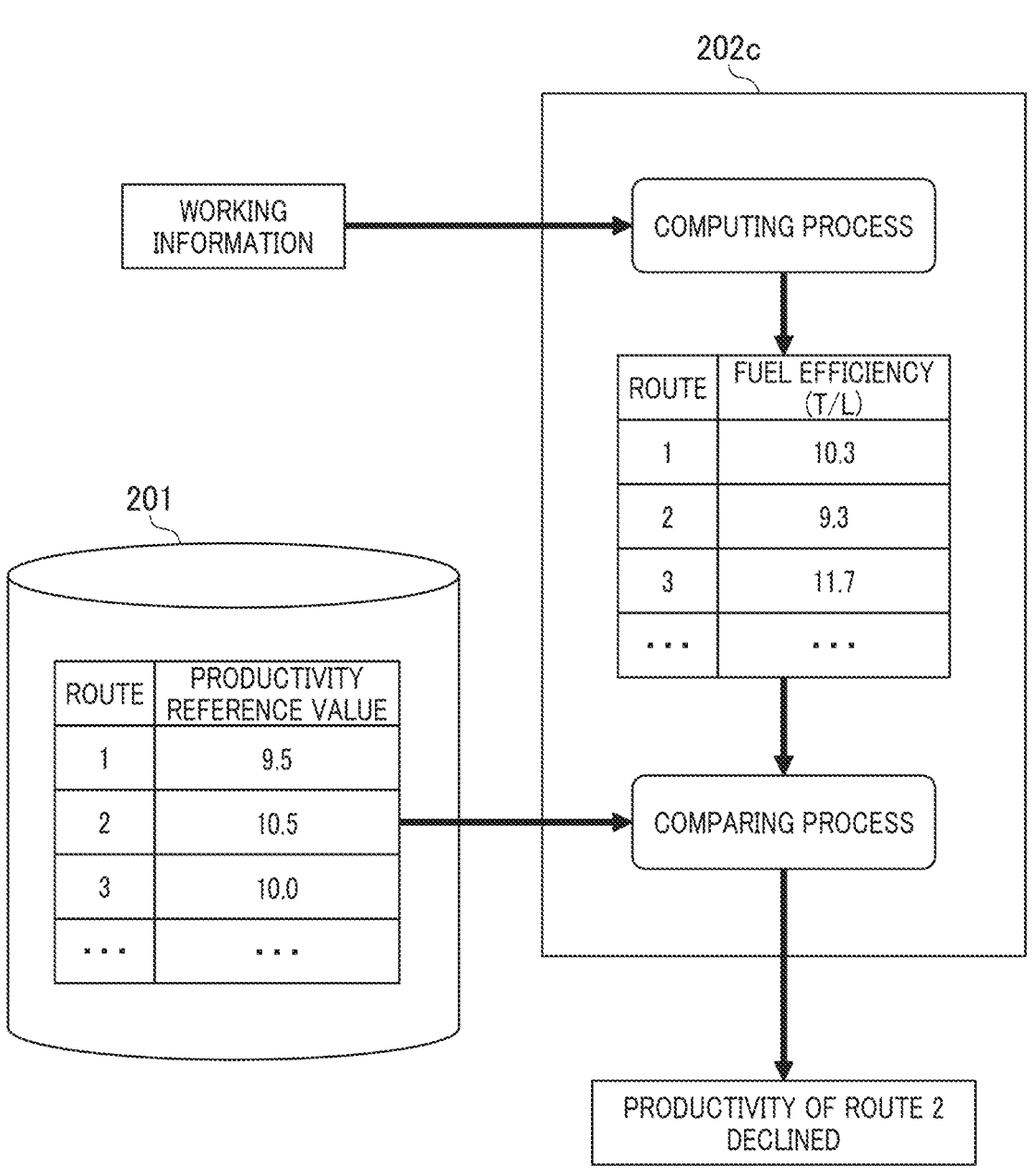
FIG. 3 is a diagram illustrating an example of a processing sequence of a productivity decline determining section.

FIG. 3 illustrates an example of a processing sequence of the productivity decline determining section 202c. In FIG. 3, the productivity decline determining section 202c computes productivity indexes of the respective routes determined by the mesh processing section 202a, from working information (amounts of consumed fuel, load transportation rates, traveled distances, traveled times, etc.). According to the present embodiment, the productivity decline determining section 202c computes a fuel efficiency (T/L) representing a load transportation rate per liter of fuel as a productivity index. However, the productivity decline determining section 202c may compute a time efficiency (T/h) representing a load transportation rate per unit time or a reciprocal thereof as a productivity index. The productivity decline determining section 202c then compares a productivity index and a productivity reference value with each other with respect to each of the routes, and, if there is a route where the productivity index is lower than the productivity reference value, determines that the productivity of the route has dropped.

Referring back to FIG. 2, the productivity decline factor separating section 202d totals productivity indexes depending on productivity decline factors and causes the display terminal device 203 to display vehicle information relevant to the productivity decline factors. Preferably, the productivity decline factor separating section 202d may search for similar cases in the past and their countermeasures and cause the display terminal device 203 to display a list of cases in order of progressive similarity, as recommended means for improving the productivity. With this arrangement, it is possible to maintain and improve the productivity of the mine and to take quick countermeasures by displaying productivity decline factors on the display terminal device 203.

Figure 4:
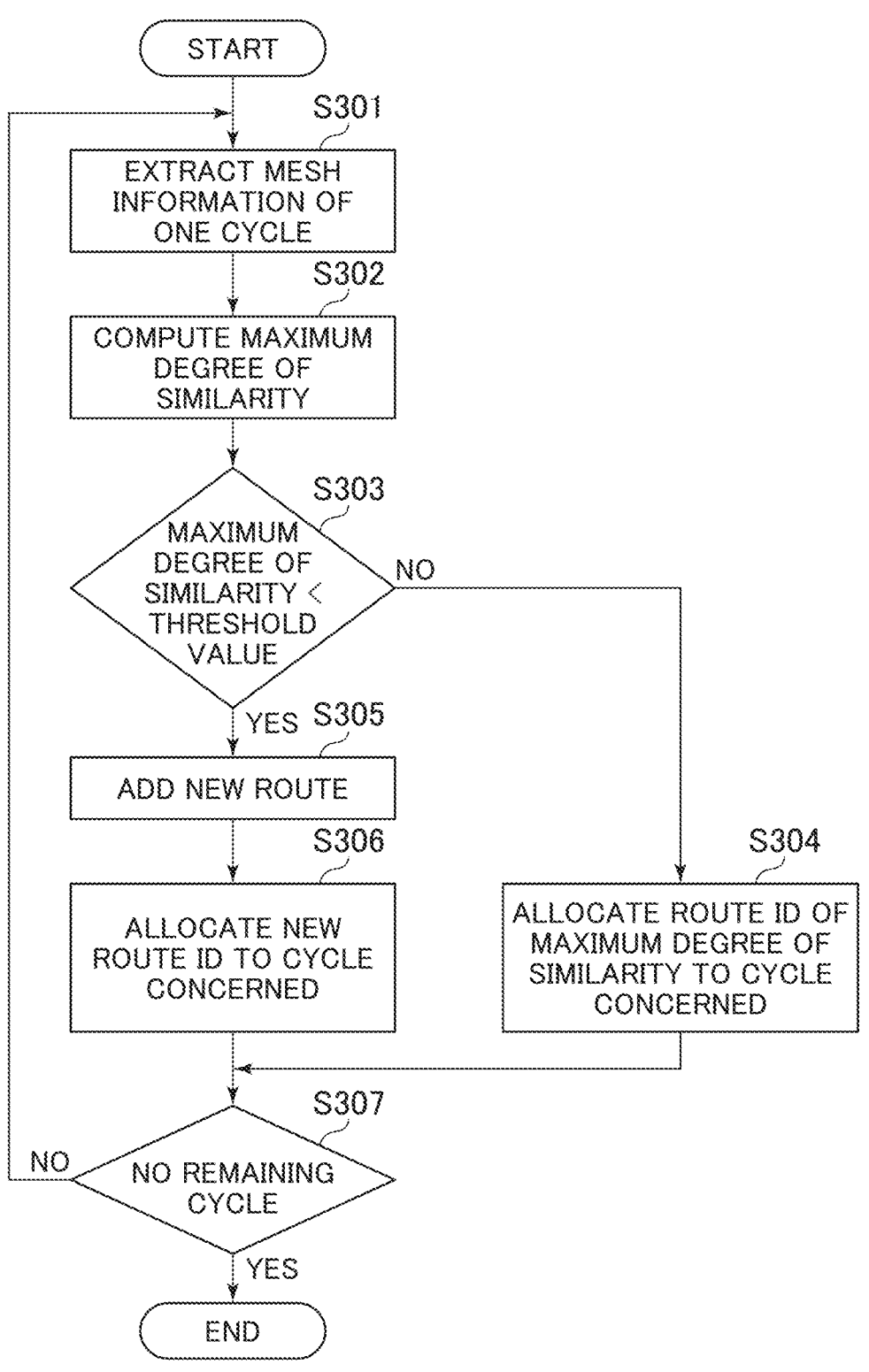
FIG. 4 is a flowchart illustrating an example of a processing sequence of a route determining section.

FIG. 4 is a flowchart illustrating an example of a processing sequence of the route determining section 202b. The steps of the flowchart will be described successively hereinbelow.

First, the route determining section 202b extracts mesh information of one cycle (step S301). Earth removal means a situation where the load weight is reduced below a predetermined value as detected by load weight detecting means (e.g., a damper pressure sensor on the suspension) on each of the mine vehicles 101, and the load may refer to not only soil but also minerals such as ore, coal, etc. Mesh information represents inherent IDs (mesh IDs) uniquely determined by a position (latitude, longitude) such as quadkey, geohash, or the like and a mesh size. If mesh IDs are identical to each other, then they can be decided as representing the same mesh. Mesh information is not limited to inherent IDs and may be any information with which the positional relation between meshes can be decided, such as two-dimensional coordinates of meshes.

After step S301, the route determining section 202b computes degrees of similarity between a mesh group (C) of the cycle and a mesh group (R) linked with the route IDs registered in the database 201, and computes the degree of similarity of the route whose degree of similarity is maximum as a maximum degree of similarity (step S302). In this manner, a route ID whose degree of similarity is maximum is extracted. According to the present embodiment, as described later, the Jaccard distance (R & C)/R between an inherent ID group (R) of a plurality of meshes linked with route IDs and an inherent ID group (C) of a plurality of meshes extracted from the cycle is used as a degree of similarity. Prior to the computation of the maximum degree of similarity, it is preferable to compare the numbers of inherent IDs of the ID group (C) and the ID group (R) with each other and not to compute a degree of similarity in order to avoid wasteful computations if the difference or ratio between the compared numbers is larger than a predetermined value.

After step S302, the route determining section 202b determines whether or not the maximum degree of similarity is smaller than a threshold value (e.g., a Jaccard distance of 0.8 where 80 percent of the meshes in the cycle agree with the route) (step S303).

If the route determining section 202b determines NO (the maximum degree of similarity is equal to or larger than the threshold value) in step S303, then it allocates to the cycle the route ID information for which the maximum degree of similarity has been computed with respect to the cycle, thereby classifying the cycle to the routes registered in the database 201 (step S304).

If the route determining section 202b determines YES (the maximum degree of similarity is smaller than the threshold value) in step S303, then it determines that there is no relevant route and registers a new route ID and the mesh ID group of the cycle as new route information in the database 201 (step S305), and then allocates the new route ID information to the cycle, thereby likewise classifying the cycle to the routes registered in the database 201 (step S306).

After step S306, the route determining section 202b determines whether or not the processing of steps S301 through S306 has been performed on all the cycles extracted from the buffer (whether or not there are remaining cycles) (step S307). If the route determining section 202b determines YES (there are no remaining cycles) in step S307, then it brings the processing sequence to an end. If the route determining section 202b determines NO (there are remaining cycles) in step S307, then it goes back to step S301. With this arrangement, it is possible to quickly assign route IDs and mesh information to the working data of the mine vehicles 101.

Figure 5:
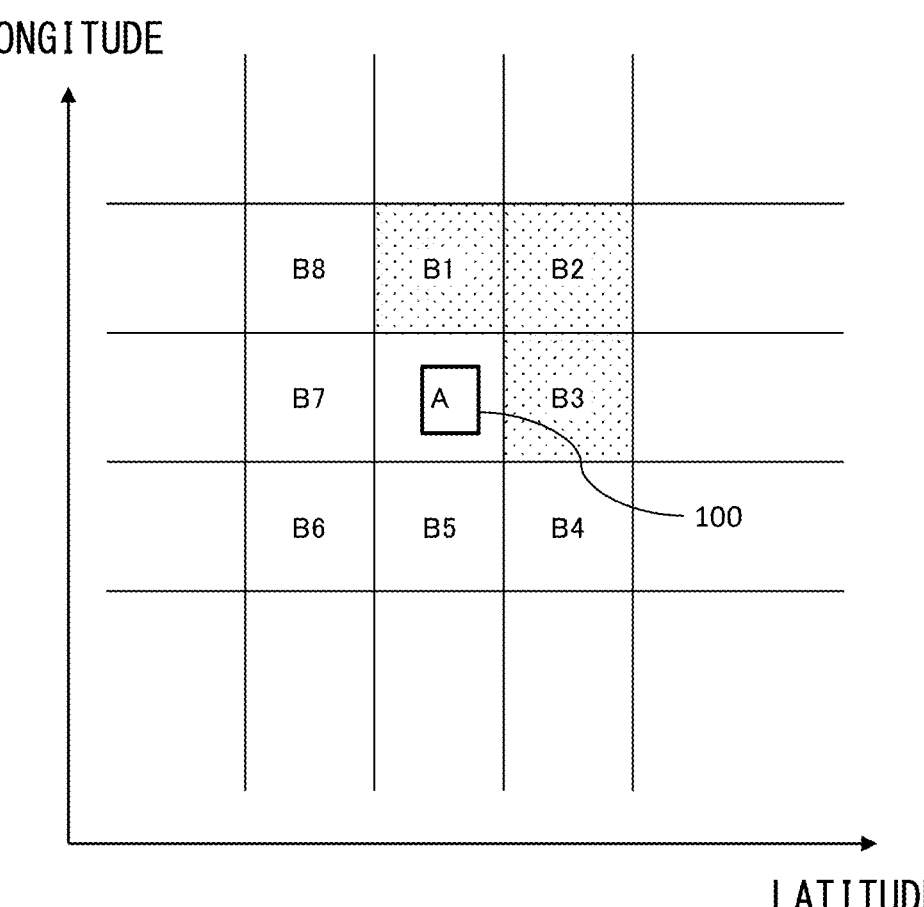
FIG. 5 is a diagram illustrating an example of mesh information computed from positional information of mine vehicles.

FIG. 5 illustrates an example of mesh information computed from the positional information of the mine vehicles 101. As described above with reference to FIG. 3, the working information of a mine vehicle 101 is linked to the inherent ID of a mesh on the basis of the vehicle position obtained from the GPS sensor, etc. The inherent ID is herein indicated by A. B1 through B8 refer to the inherent IDs of meshes (adjacent meshes) adjacent to A. According to the present embodiment, these adjacent meshes are included in a mesh group of existing routes, making it possible to perform a route determining process that is robust against GPS errors and travel path deviations. The size of meshes should preferably be determined on the basis of the size of vehicles, the maximum vehicle speed, and the sampling interval for working information. Specifically, the size of meshes should be established in order to prevent positional information obtained in a next sampling process from jumping adjacent meshes. For example, if the maximum speed of vehicles for a sampling interval of one second is 20 m/s, then a minimum mesh size is 20 m, and if vehicle dimensions are indicated by 15×10 m, each side of meshes may be set to substantially 30 m in view of GPS-installed position and GPS accuracy. The difference between adjacent meshes and a rounding process is that, while the rounding process includes only mesh information such as B1 through B3 of one zone oblique to the vehicle, the adjacent meshes include omnidirectional information. Using adjacent meshes, a correct route can be determined even if positional information contains errors in forward and rearward directions, leftward and rightward directions, and oblique directions.

Figure 6:
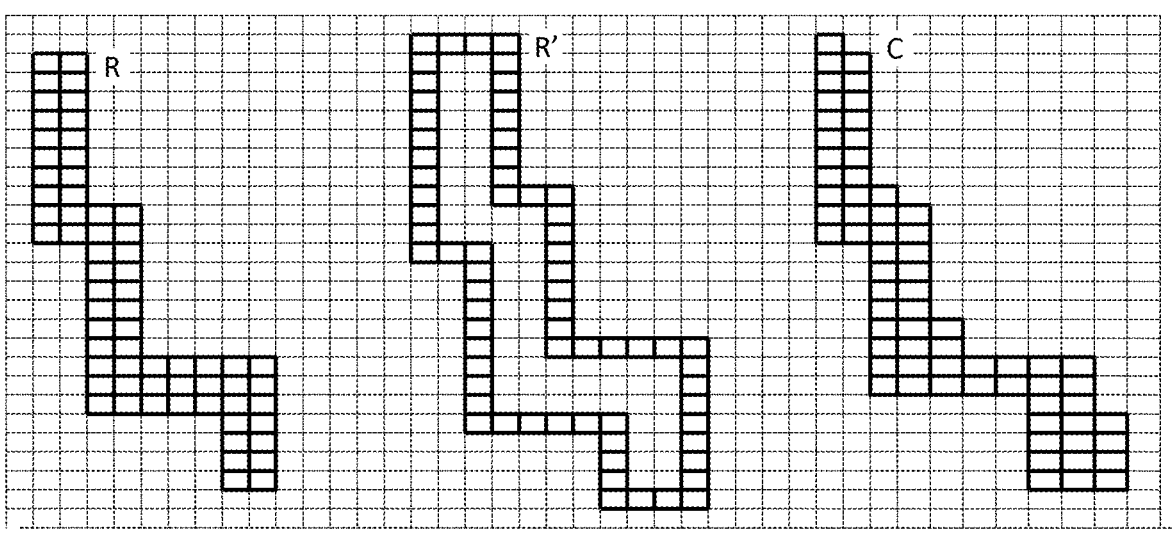
FIG. 6 is a diagram illustrating an example of a method of computing a degree of similarity between mesh information of a travel cycle as a route determination target and mesh information of routes.

FIG. 6 illustrates an example of a method of computing a degree of similarity between mesh information of a travel cycle as a route determination target and mesh information of routes. In FIG. 6, R indicates a mesh group of a route registered in the database 201, R' a mesh group adjacent to the mesh group R that is computed on the basis of the relation illustrated in FIG. 5, and C a mesh group in a travel cycle. The degree of similarity between the mesh groups R and C is defined as a value computed by dividing the number of the meshes of the mesh groups R and C that overlap each other by the number of the meshes of the mesh group R (degree of similarity 1). Otherwise, a value computed by dividing the number of the overlapping meshes of a mesh group R+R' representing the sum of the mesh group R and the adjacent mesh group R' and the mesh group C by the number of the meshes of the mesh group C (degree of similarity 2) may be used. In this manner, it is possible to determine a route with reduced effects of GPS errors and travel path deviations. According to the present embodiment, although adjacent mesh information is used to determine routes, since the working information is linked with the inherent mesh IDs and the route IDs, the working data obtained when adjacent routes are traveled will not be totaled in error, unlike the rounding process.

Figure 7:
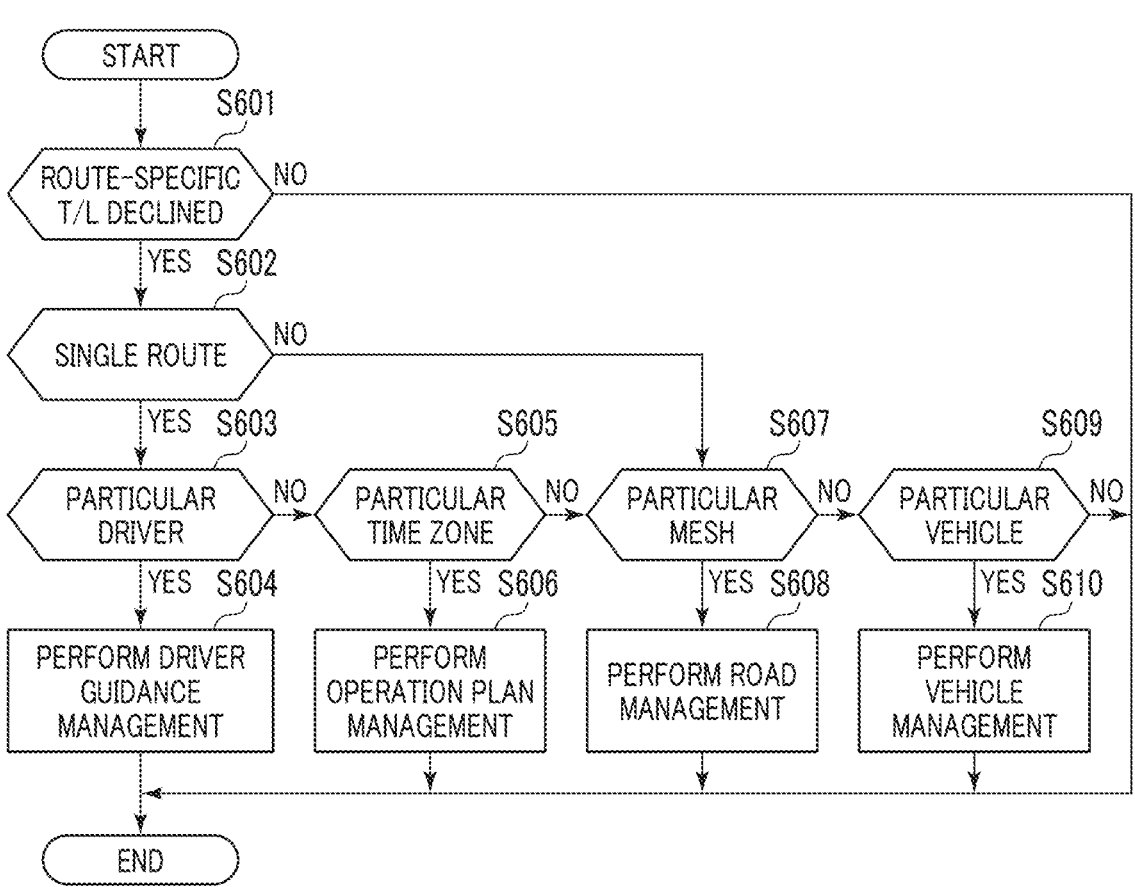
FIG. 7 is a flowchart illustrating an example of a processing sequence of a productivity decline factor separating section.

FIG. 7 is a flowchart illustrating an example of a processing sequence of the productivity decline factor separating section 202d. The steps of the flowchart will be described successively hereinbelow.

First, the productivity decline factor separating section 202d determines whether or not any one of the productivity indexes totaled with respect to the respective routes is smaller than a predetermined value (whether or not the productivity declined) (step S601). If the productivity decline factor separating section 202d determines NO in step S601, then it brings the processing sequence to an end. If the productivity decline factor separating section 202d determines YES in step S601, then it determines whether or not the route whose productivity declined is a single route (step S602).

If the productivity decline factor separating section 202d determines NO in step S602, then it goes to step S607 to be described later. If the productivity decline factor separating section 202d determines YES in step S602, then it totals productivity indexes with respect to the respective drivers and determines whether or not the productivity indexes of particular drivers declined (step S603). If the productivity decline factor separating section 202d determines YES in step S603, then it causes the display terminal device 203 to display the productivity indexes of the respective drivers and the productivity decline factors thereof for driver guidance management (step S604), and brings the processing sequence to an end. If the productivity decline factor separating section 202d determines NO (the productivity indexes of particular drivers did not decline) in step S603, it totals productivity indexes with respect to respective time zones and determines whether or not the productivity indexes of particular time zones declined (step S605).

If the productivity decline factor separating section 202d determines YES in step S605, then it causes the display terminal device 203 to display the productivity indexes of the respective time zones and the productivity decline factors thereof for operation plan management (step S606), and brings the processing sequence to an end. If the productivity decline factor separating section 202d determines NO in step S605, then it totals productivity indexes with respect to respective meshes and determines whether or not the productivity indexes of particular meshes declined (step S607).

If the productivity decline factor separating section 202d determines YES in step S607, then it causes the display terminal device 203 to display the productivity indexes of particular meshes and the productivity decline factors thereof for road management (step S608), and brings the processing sequence to an end. If the productivity decline factor separating section 202d determines NO in step S607, then it totals productivity indexes with respect to respective vehicles and determines whether or not the productivity indexes of particular vehicles declined (step S609).

If the productivity decline factor separating section 202d determines NO in step S609, then it brings the processing sequence to an end. If the productivity decline factor separating section 202d determines YES in step S609, then it causes the display terminal device 203 to display the totaled productivity information of the respective vehicles and the productivity decline factors thereof for vehicle management (step S610), and brings the processing sequence to an end.

By thus computing and totaling productivity indexes with respect to the respective routes and making an analysis relating to productivity decline factors while paying attention to a single route, the productivity decline factors can be separated. If no productivity decline with respect to particular vehicles is observed in step S609, then the processing sequence comes to an end for the reason of uncertain countermeasures. Although not illustrated in the processing sequence, for example, the number of times that unknown factors are decided may be counted, and if it is larger than a predetermined count, then the productivity reference values of the respective routes and the references by which to decide a productivity decline with respect to particular drivers, particular time zones, particular meshes, and particular vehicles may be reconsidered to reduce the number of times that uncertain countermeasures are decided.

Figure 8:
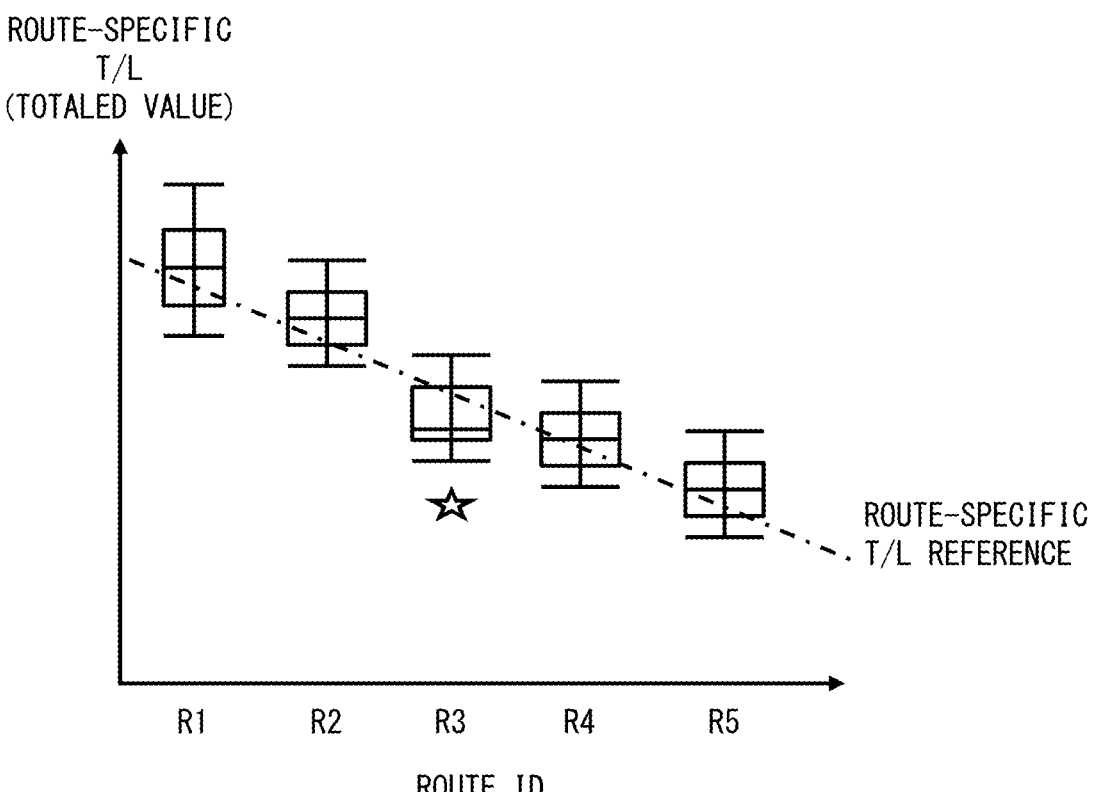
FIG. 8 is a box chart illustrating an example of a result representing totaled values of fuel efficiencies as productivity indexes on respective routes.

FIG. 8 is a box chart illustrating an example of a result representing totaled values of fuel efficiencies (T/L) as productivity indexes on respective routes. For an easier understanding, route-specific productivity indexes are illustrated in order of progressively larger values from the left to the right in FIG. 8. There are considered some methods of detecting a productivity decline. According to one of such methods, for example, a productivity decline can be detected by an increase in outliers (data indicated by a star mark at a route R3) smaller than the productivity reference value or comparing the productivity reference value and a median with each other. In this case, productivity indexes may be totaled on the basis of a particular data count or a particular time until a determining time, or preferably, productivity indexes may be totaled on only those routes where there are a number of pieces of data equal to or larger than a particular count at a particular time, and compared with the reference value. According to a method of displaying route-specific productivity indexes, route-specific productivity indexes may be displayed in order of progressively larger route distances from the left to the right. In this case, providing the altitude differences between routes are the same, route-specific productivity reference values are progressively smaller from the left to the right. Moreover, the route-specific productivity reference values registered in the database 206 may be determined, for example, from an average value of route-specific productivity indexes in the past, so that a drop from the standard productivity of the mine in the past can be detected. Alternatively, an average value of data representing good route-specific productivity indexes owing to highly skilled veteran drivers, good road conditions, etc. may be registered in the database 206 for detecting a drop from the high-level productivity in the past.

Figure 9:
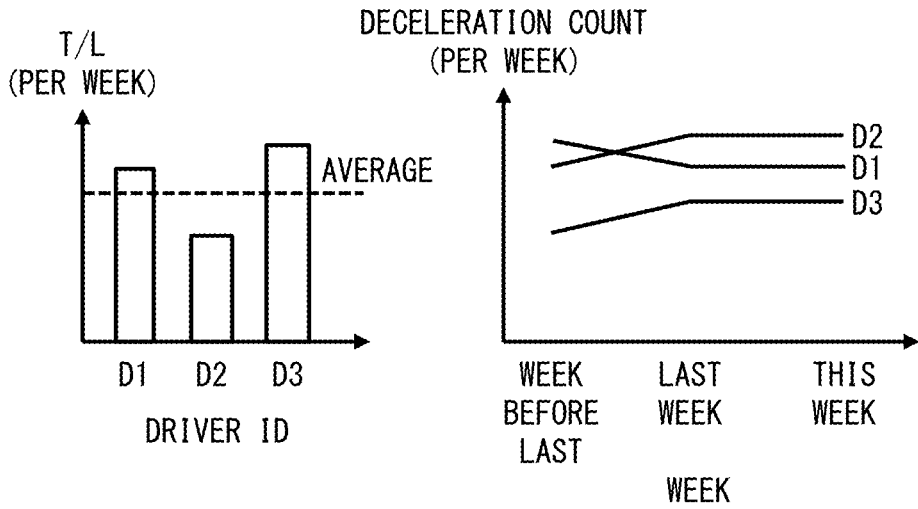
FIG. 9 is a diagram illustrating an example of a driver guidance management dashboard.

FIG. 9 illustrates an example of a driver guidance management dashboard. In this example, the driver guidance management dashboard displays an average value of productivity indexes totaled per week with respect to respective drivers and also displays a history of changes in a parameter (deceleration count in this example) that represents a productivity decline factor. It can be seen from FIG. 9 that the productivity of a driver D2 is lower than the productivity of other drivers and the deceleration count of the driver D2 exhibits an increasing tendency. When the driver guidance instructor 103 has noticed the inclination (to apply the brake excessively in this example) to be improved of the driver D2, the driver guidance instructor 103 may conduct appropriate driver guidance on the driver D2 for quickly improving the productivity decline. Furthermore, the driver guidance instructor 103 may grasp whether or not an improving effect has arisen from the driver guidance by confirming the driver guidance management dashboard again. By thus displaying a history of changes in a parameter that represents a productivity decline factor together with the productivity indexes, it is possible to take improvement measures suitable for the productivity decline.

Figure 10:
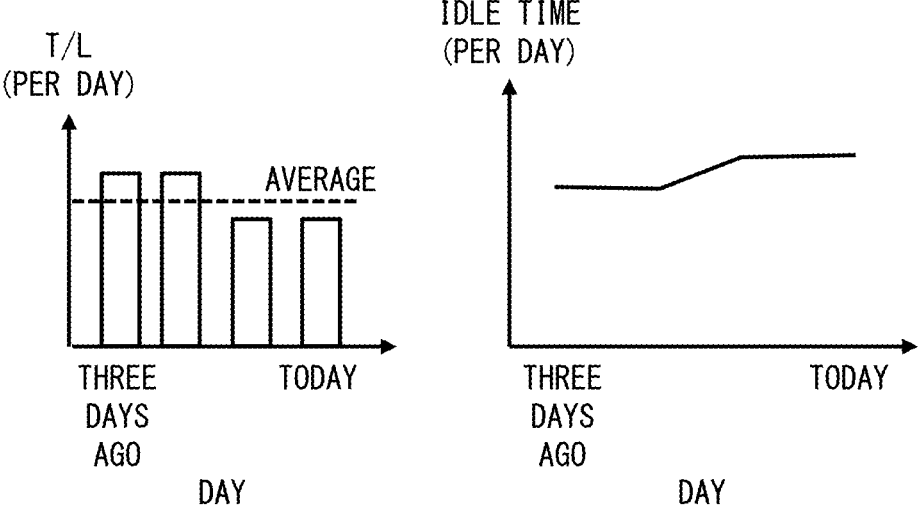
FIG. 10 is a diagram illustrating an example of a driving plan management dashboard.

FIG. 10 illustrates an example of a driving plan management dashboard. In this example, the driving plan management dashboard displays productivity indexes (T/L) totaled per day and also displays a history of changes in a parameter (idle time in this example) that represents a productivity decline factor. The operation administrator 102 can detect a productivity decline by comparing a productivity index with an average value of productivity indexes over the latest few days. When the operation administrator 102 has confirmed an increase in idle time that represents a productivity decline factor, the operation administrator 102 can eliminate the productivity decline factor at an early stage by correcting the operation plan.

Figure 11:
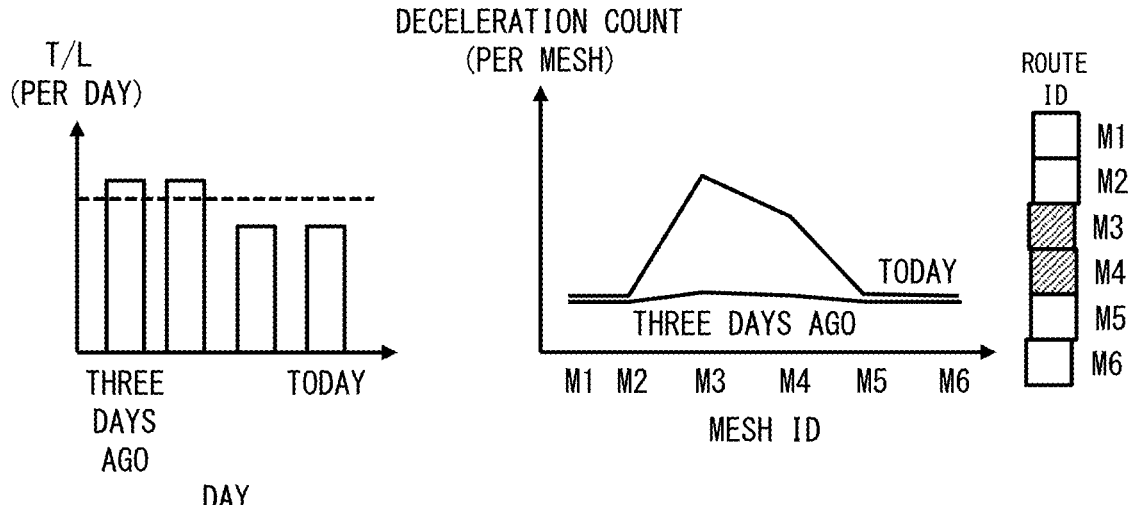
FIG. 11 is a diagram illustrating an example of a road management dashboard.

FIG. 11 illustrates an example of a road management dashboard. In this example, the road management dashboard displays productivity indexes (T/L) totaled per day and also displays a history of changes in a parameter (deceleration count in this example) that represents a productivity decline factor with respect to respective meshes making up the route whose productivity declined. The road maintenance worker 104 can grasp the extent to which a road impairment has been developed, by confirming a change in the deceleration count per mesh. As illustrated in FIG. 11, a location where the road is to be improved can quickly be grasped by visualizing the positional information of a mesh group making up a route and indicating the road of which mesh has been impaired.

Figure 12:
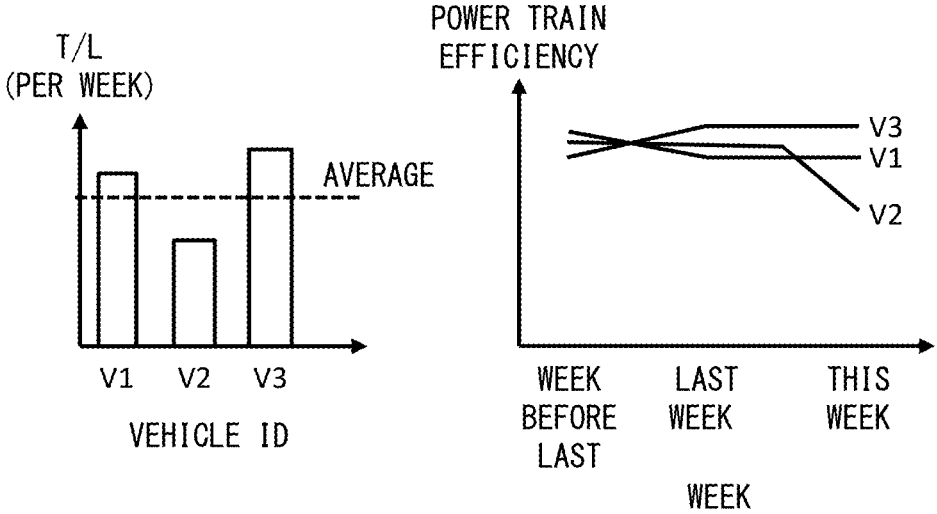
FIG. 12 is a diagram illustrating an example of a vehicle management dashboard.

FIG. 12 illustrates an example of a vehicle management dashboard. In this example, the vehicle management dashboard displays productivity indexes (T/L) totaled per week with respect to respective vehicles and also displays a history of changes in a parameter (power train efficiency in this example) that represents a productivity decline factor. The vehicle maintenance worker 304 can decide at an early stage whether or not the power train (an engine, a generator, a transmission, an electric motor, etc.) of a vehicle needs to be inspected, by comparing a history of changes in the power train efficiency with those of other vehicles and grasping the extent to which the changes have been developed and the differences between the changes, and make appropriate adjustments or part replacements, thereby improving a productivity decline at an early stage. The data illustrated in FIGS. 9 through 12 are given by way of example only, and productivity indexes may be totaled and displayed at desired intervals, not necessarily per week or per day.

(Conclusions)

According to the present embodiment, the mine management system 200 for managing the productivity of a mine on the basis of the positional information and working information of the mine vehicles 101 includes the processing device 202 that has a computing function, the display terminal device 203 that is capable of displaying computed results from the processing device 202, and the storage device 201 that stores mesh information of a plurality of routes around the mine along which the mine vehicles 101 move from a location where earth is dumped to a location where the mine vehicles 101 are loaded with a load and then move again to the earth removing location and also stores productivity reference values of the respective routes. The processing device 202 is configured to generate mesh information of travel cycles in which the mine vehicles 101, after having dumped earth, move to the location where the mine vehicles 101 are loaded with a load and then move again to the earth removing location, on the basis of the positional information of the mine vehicles 101, compare the mesh information of the travel cycles with the mesh information of the routes stored in the storage device 201 to classify the travel cycles to any one of the routes, compute productivity indexes of the travel cycles on the basis of the working information of the mine vehicles 101, compare the productivity indexes of the travel cycles with the productivity reference value of the one of the routes to detect a productivity decline of the one of the routes, and output the detected productivity decline to the display terminal device 203.

According to the present embodiment thus arranged, by comparing the mesh information of the travel cycles obtained from the working data with the mesh information of the routes stored in the storage device 201, it is possible to classify the travel cycles accurately to any one of the routes. Moreover, by comparing the productivity indexes of the travel cycles with the productivity reference value of the relevant route, it is possible to accurately detect a productivity decline of the travel cycles. In this manner, the productivity of the mine can accurately be maintained and managed.

Further, the processing device 202 is configured to determine whether or not the travel cycles are classified to the one of the routes, on the basis of the degree of similarity between the mesh information of the travel cycles and the mesh information of the one of the routes. In this manner, it is possible to increase the accuracy with which to determine the route of the travel cycles.

The mesh information of the one of the routes includes the information of the first mesh group R that is a set of meshes making up the one of the routes and the information of the second mesh group R' that is a set of meshes adjacent to the first mesh group R. In this fashion, it is possible to perform a route determining process that is robust against GPS errors and travel path deviations of the mine vehicles 101.

Further, the processing device 202 is configured to, when the processing device 202 detects a productivity decline of the one of the routes, output a result representing productivity indexes in the past of the one of the routes that have been totaled per driver, per day, per mesh of the route, or per mine vehicle, to the display terminal device 203. In this manner, it is possible to quickly take countermeasures against productivity decline factors.

Second Embodiment

A mine management system according to a second embodiment of the present invention will be described below with reference to FIGS. 13 through 15. According to the present embodiment, a method of improving a productivity at an early stage using two productivity indexes will be described below.

Figure 13:
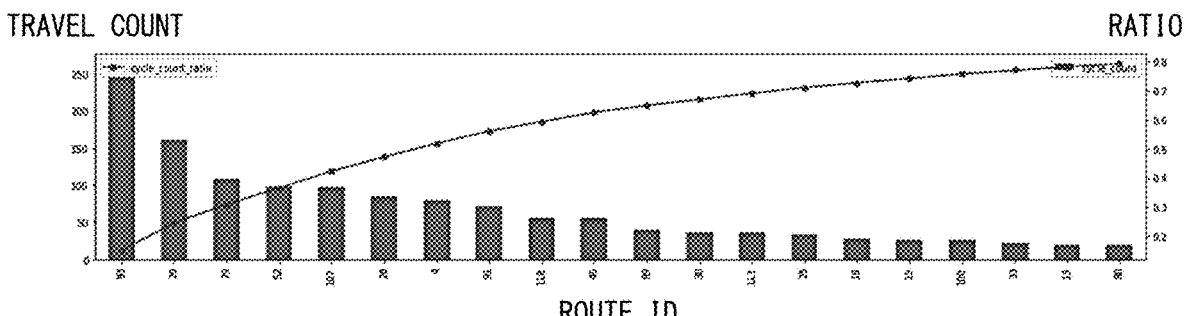
FIG. 13 is a diagram illustrating an example of a result representing totaled values of travel counts on respective routes in a predetermined period.

FIG. 13 illustrates an example of a result representing totaled values of travel counts on respective routes in a predetermined period. In FIG. 13, a polygonal-line curve indicates cumulative frequencies, and the total of travel counts along 20 routes indicated here cover 80 percent of all travel counts in the predetermined period. According to the present embodiment, a productivity decline is detected not in all the routes but in only routes where travel counts are large (i.e., routes that have a large effect on the productivity of the mine in its entirety). This makes it possible to efficiently maintain and improve the productivity of the mine.

Figure 14:
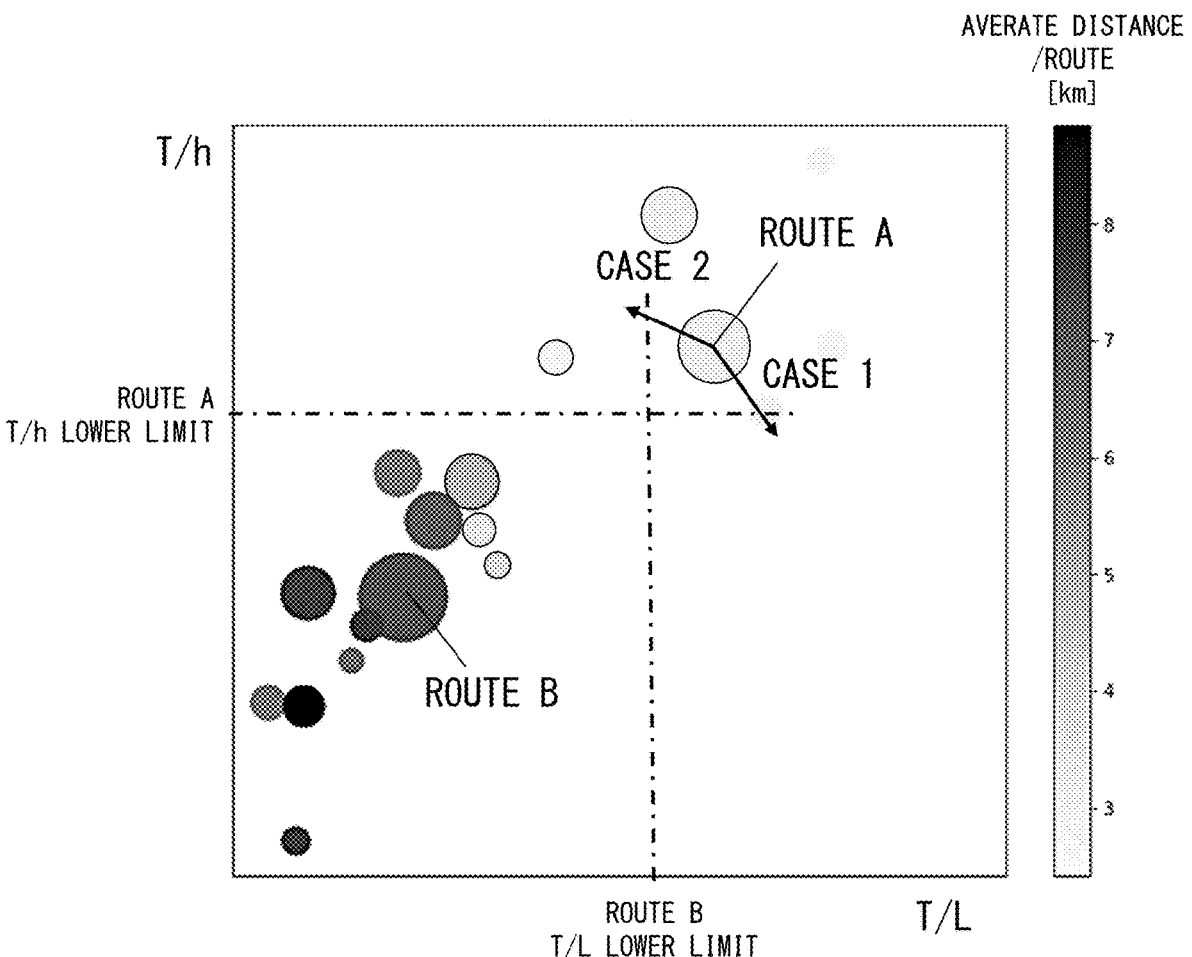
FIG. 14 is a diagram illustrating an example of a result representing totaled values of two productivity indexes (fuel efficiency and time efficiency) on respective routes.

FIG. 14 illustrates an example of a result representing totaled values of two productivity indexes (fuel efficiency and time efficiency) on respective routes. In FIG. 14, the horizontal axis represents the fuel efficiency (T/L) as a first productivity index, and the vertical axis represents the time efficiency (T/h) as a second productivity index. The size of each of plotted data pieces indicates the travel count on the relevant route, and the shade of each of plotted data pieces indicates the average distance along the relevant route. The result illustrated in FIG. 14 represents the data illustrated in FIG. 13 that have been re-totaled per day, and routes A and B represent the two routes in FIG. 13 whose travel counts are the largest and the second largest. As illustrated in FIG. 14, as distances along routes are longer (as the shades of plotted data pieces are darker), the plotted data pieces tend to be positioned in a lower left area, and as distances along routes are shorter (as the shades of plotted data pieces are lighter), the plotted data pieces tend to be positioned in an upper right area. As illustrated in FIG. 14, a lower limit value (illustrated only for the route A) for the productivity indexes with respect to the respective routes is established, and a productivity decline is detected when a productivity index becomes smaller than the lower limit value. For example, in case 1, the fuel efficiency (T/L) is increased, but the time efficiency (T/h) is reduced, whereas, in case 2, the time efficiency (T/h) is increased, but the fuel efficiency (T/L) is reduced. Since different countermeasures are taken against the reduced fuel efficiency (T/L) and the reduced time efficiency (T/h), appropriate analysis and improvement measures are carried out against both of them according to a method described below.

Figure 15:
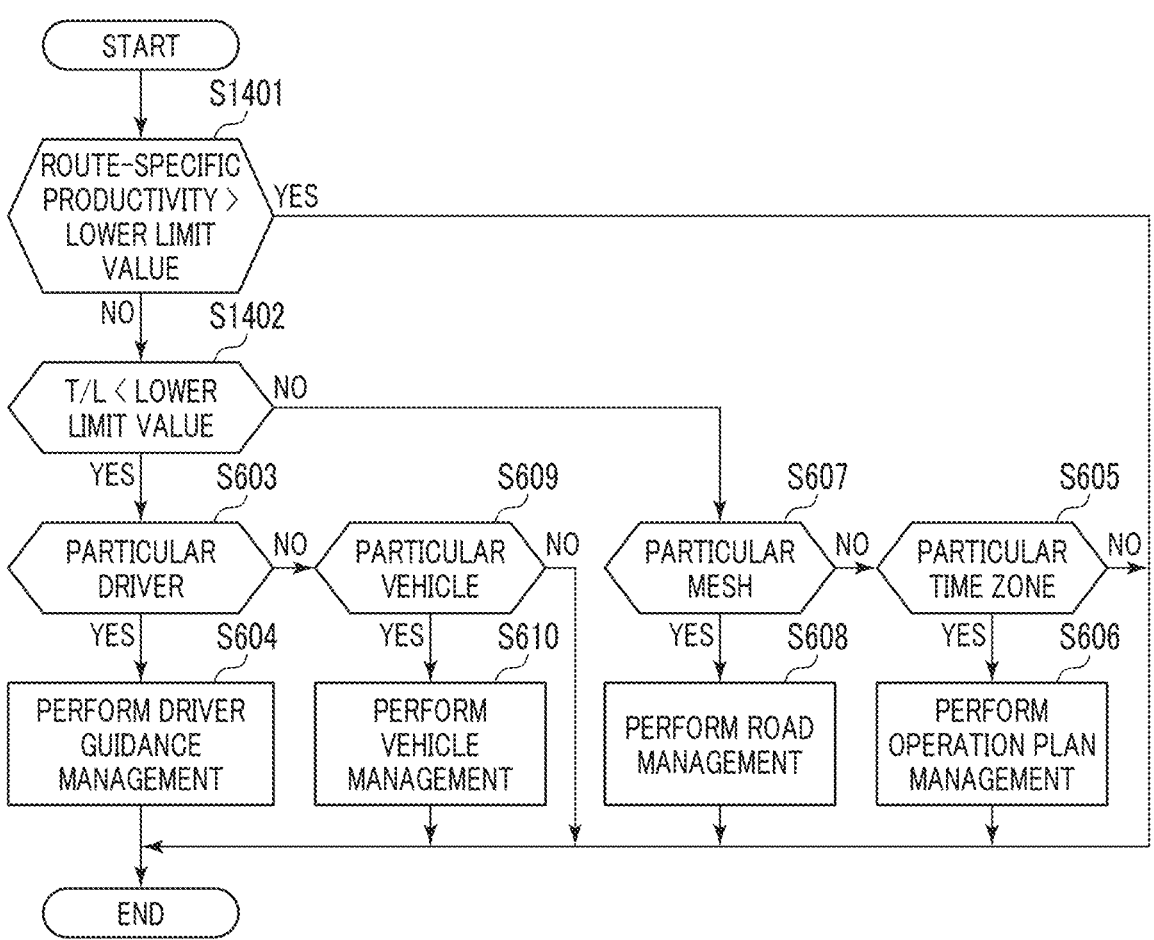
FIG. 15 is a flowchart illustrating a processing sequence of a productivity decline factor separating section according to a second embodiment of the present invention.

FIG. 15 is a flowchart illustrating a processing sequence of a productivity decline factor separating section 202d according to the present embodiment. The differences from the first embodiment (illustrated in FIG. 7) will mainly be described below.

First, the productivity decline factor separating section 202d determines whether or not the productivity indexes totaled with respect to the respective routes are larger than the lower limit value established for the productivity indexes with respect to the respective routes (step S1401). If the productivity decline factor separating section 202d determines YES in step S1401, then it brings the processing sequence to an end. If the productivity decline factor separating section 202d determines NO in step S1401, then it determines whether or not the fuel efficiency (T/L) is smaller than a preset lower limit value (step S1402). If the route-specific productivity indexes are equal to or smaller than the lower limit value (NO in step S1401) and the fuel efficiency (T/L) is equal to or larger than the lower limit value (NO in step S1402), then it means that the time efficiency (T/h) is reduced.

If the productivity decline factor separating section 202d determines YES in step S1402, then it causes the display terminal device 203 to display a factor that is highly sensitive to the fuel efficiency (T/L) for driver guidance management or vehicle management (step S604 or step S610), and then brings the processing sequence to an end. If the productivity decline factor separating section 202d determines NO in step S1402, it causes the display terminal device 203 to display a factor that is highly sensitive to the time efficiency (T/h) for road management or operation plan management (step S608 or step S606).

(Conclusions)

A productivity index according to the present embodiment includes a time efficiency (T/h) representing a load transportation rate per unit time of the mine vehicles 101 and a fuel efficiency (T/L) representing a load transportation rate per unit amount of fuel of the mine vehicles 101. The storage device 201 stores a proper range for the time efficiencies (T/h) and the fuel efficiencies (T/L) of the mine vehicles 101 as a productivity reference value, and the processing device 202 is configured to, when at least one of the time efficiency (T/h) and the fuel efficiency (T/L) on one route to which travel cycles are classified falls out of the proper range, detect a productivity decline on the one route and output a productivity decline factor to the display terminal device 203.

According to the present embodiment thus arranged, since the time efficiencies (T/h) and the fuel efficiencies (T/L) of the mine vehicles 101 are monitored as productivity indexes, and productivity decline factors therefor are displayed on the display terminal device 203, it is possible to take appropriate countermeasures against declines in any of the productivity indexes.

Third Embodiment

A mine management system according to a third embodiment of the present invention will be described below with reference to FIGS. 16 and 17. According to the present embodiment, a method of detecting a productivity decline using a cluster distance will be described below. For the sake of simplicity, a cluster distance where a traveled distance and a fuel efficiency (T/L) represent parameters is used in the description below. However, a time efficiency (T/h) or the like may be added as a parameter.

Figure 16:
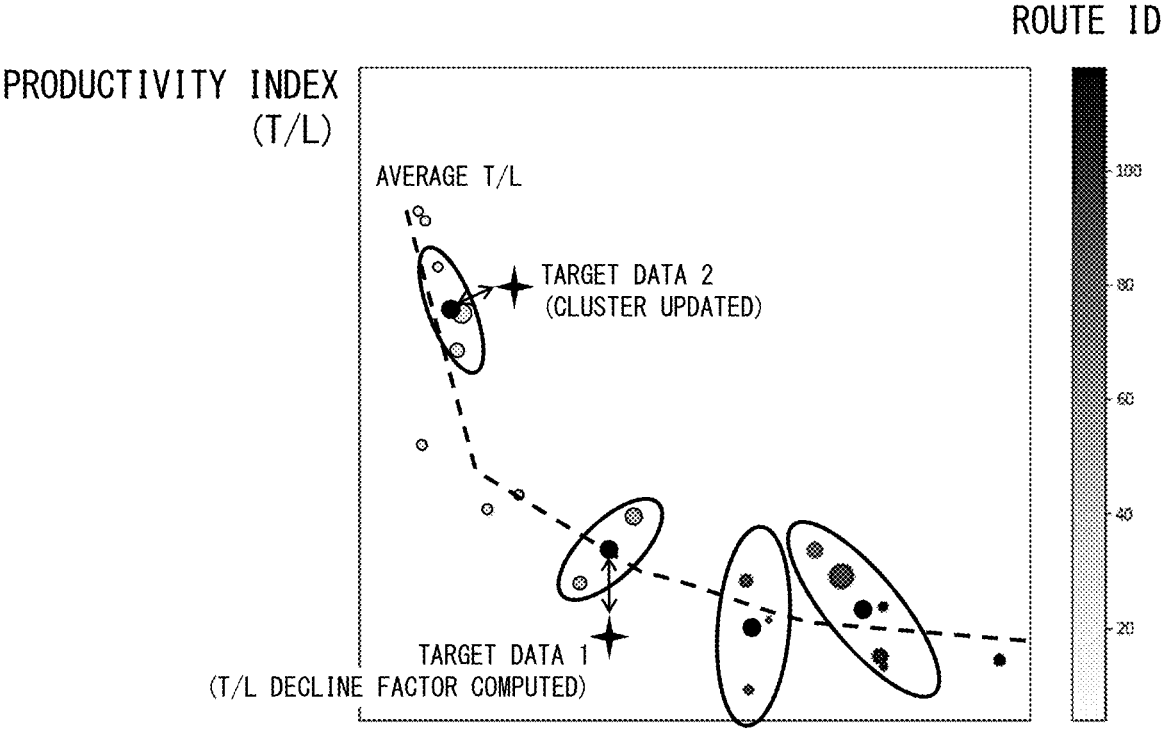
FIG. 16 is a diagram illustrating an example of a result representing totaled values of productivity indexes (fuel efficiency) and traveled distances on respective routes.
Figure 17:
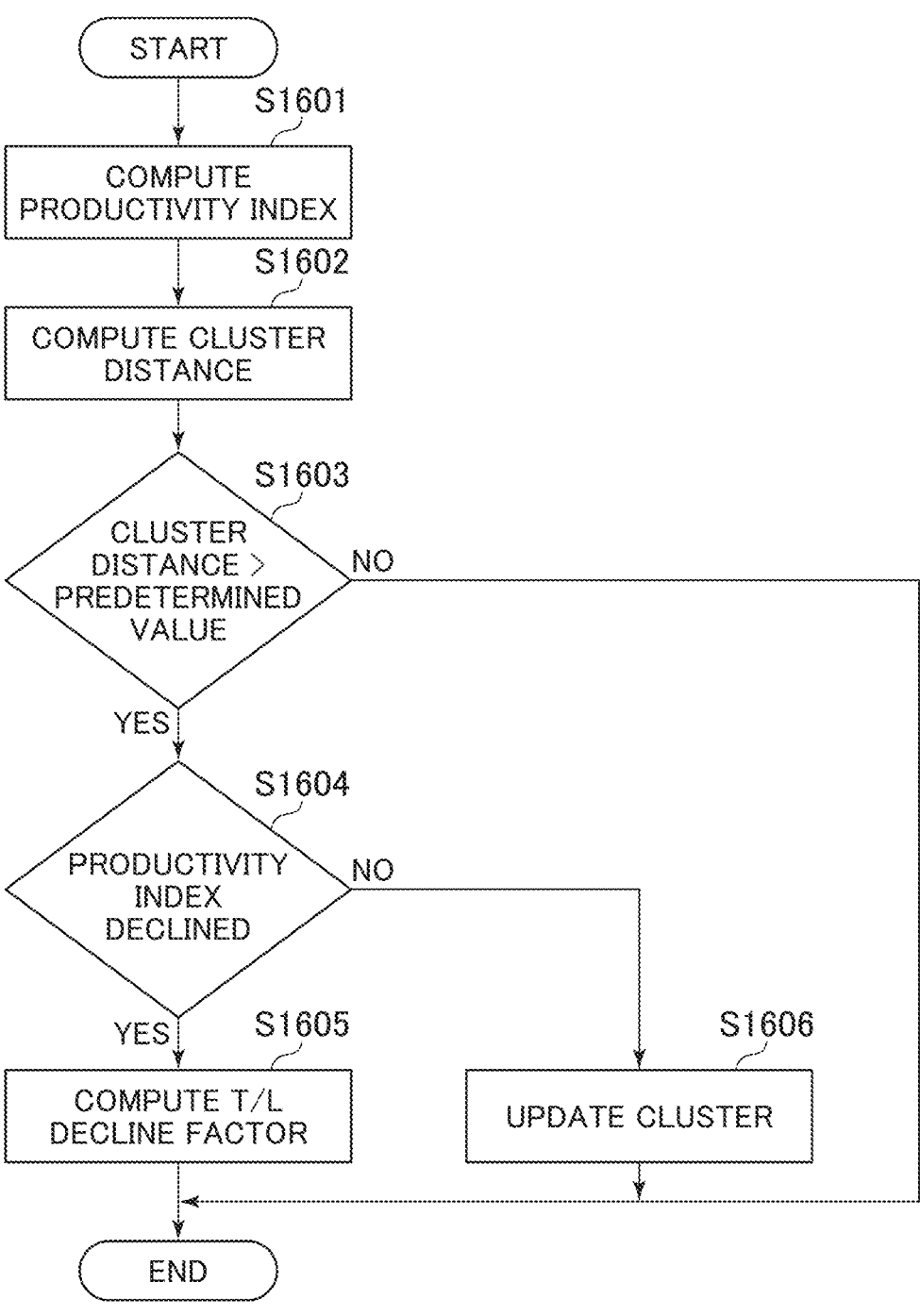
FIG. 17 is a flowchart illustrating a processing sequence of a productivity decline determining section and a productivity decline factor separating section according to a third embodiment of the present invention.

FIG. 16 illustrates an example of a result representing totaled values of productivity indexes (fuel efficiency) and traveled distances on respective routes. FIG. 16 is a distribution diagram that has a vertical axis representing the fuel efficiency (T/L) and a horizontal axis representing traveled distances, and plots data pieces totaled per day. The shades of the plotted data pieces indicate route IDs. As illustrated in FIG. 16, the productivity index (T/L) has a tendency to decrease as the traveled distance becomes longer. A productivity decline can be detected at an early stage by clustering totaled data pieces on the same route according to a clustering process such as k-means or the like and computing a distance (cluster distance) from a closest cluster of target data. There are some methods of computing a cluster distance. The example illustrated in FIG. 16 uses a centroid method where the distance (indicated by two-way arrows) from the centroid coordinates of a cluster to target data represents a cluster distance.

FIG. 16 is a flowchart illustrating a processing sequence of a productivity decline determining section 202c and a productivity decline factor separating section 202d according to the present embodiment. The steps of the flowchart will be described successively hereinbelow.

First, the productivity decline determining section 202c computes productivity indexes of the respective routes (step S1601), computes a minimum cluster distance with respect to a preset cluster (step S1602), and determines whether or not the cluster distance is larger than a predetermined value (step S1603).

If the productivity decline determining section 202c determines NO in step S1603, it decides that there is no productivity decline, and brings the processing sequence to an end. If the productivity decline determining section 202c determines YES in step S1603, it determines whether or not the productivity indexes computed with respect to the respective routes are reduced (step S1604). Here, the productivity decline determining section 202c may determine a productivity decline on the basis of productivity indexes in the past (e.g., an average value in the past) computed with respect to the respective routes, or may detect a productivity decline from reference values with respect to the respective routes that have been established in advance by another method.

If the productivity decline determining section 202c determines YES in step S1604, then it computes a fuel efficiency (T/L) decline factor (step S1605). Target data 1 illustrated in FIG. 16 represent an example of data in this case. Step S1605 includes steps S603 through S610 illustrated in FIG. 7, for example.

If the productivity decline determining section 202c determines NO in step S1604, then since this means that the data pieces that make up the clusters are not appropriate, the productivity decline determining section 202c updates the clusters with the latest data including these pieces of data (step S1606), and brings the processing sequence to an end. Target data 2 illustrated in FIG. 16 represent an example of data in this case.

(Conclusions)

According to the present embodiment, the storage device 201 stores data including traveled distances and productivity indexes of proper travel cycles in the past, the traveled distances and productivity indexes having been clustered with respect to respective routes, as productivity reference values, and the processing device 202 is configured to detect a productivity decline on the basis of the distance, from a closest cluster, of the data including traveled distances and productivity indexes of travel cycles as targets to be determined for a productivity decline.

According to the present embodiment thus arranged, it is possible to increase the accuracy with which to detect a productivity decline, by detecting a productivity decline on the basis of the distance, from a closest cluster, of the data including traveled distances and productivity indexes of travel cycles.

Fourth Embodiment

A mine management system 200 according to a fourth embodiment of the present invention will be described below with reference to FIGS. 18 and 19. According to the present embodiment, a case in which productivity decline factors about productivity indexes with respect to respective routes are known, i.e., a case in which the mine management system 200 is applied to productivity improvement activities, will be described below. According to the present embodiment, a case in which setting values for the mine vehicles 101 have been changed will be described below. Vehicle setting values that affect a fuel efficiency (T/L) as a productivity index are considered to be upper- and lower-limit rotational speeds and output power limiting values for an engine, an electric motor, and a generator, for example.

Figure 18:
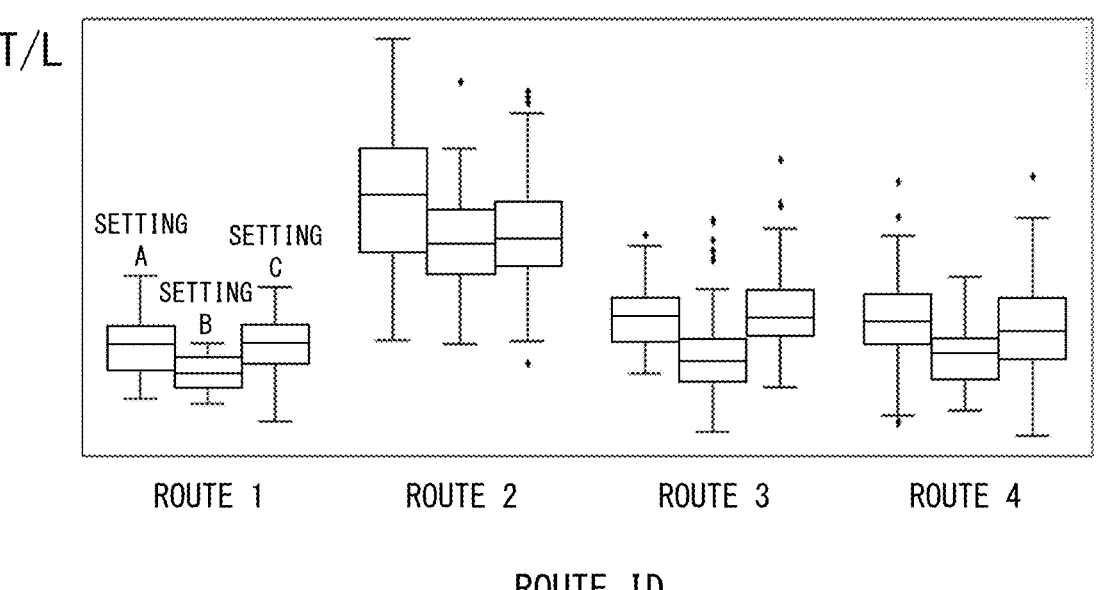
FIG. 18 is a box chart illustrating an example of a result representing totaled values of productivity indexes (fuel efficiencies) of vehicles where setting values have been changed, with respect to respective routes and respective settings.

FIG. 18 is a box chart illustrating an example of a result representing totaled values of productivity indexes (T/L) of vehicles where setting values have been changed, with respect to respective routes and respective settings. It can be seen from FIG. 18 that the productivity efficiency (T/L) of a setting B is lower as a whole than those of settings A and C. The box chart should preferably be produced from the data of vehicles that have traveled under as identical conditions as possible. For example, environmental influences such as the weather and the road can be removed by totaling the data of a plurality of vehicles that have traveled on the same day, and influences from different drivers can be removed by totaling the data of vehicles that have been driven by a plurality of drivers.

FIG. 19 illustrates an example of a comparison table of productivity indexes that are used in selecting settings of the mine vehicles 101. Travel ratios illustrated in FIG. 19 represent the travel ratios of routes for simulating productivity indexes (T/L), and may be computed from a travel history in the past or may be estimated from an excavation plan in the future. In the respective routes, there are recorded representative values (average values in this example) of the productivity indexes (T/L) with respect to the respective routes, as described above with reference to FIG. 18, and the respective productivity indexes (T/L) and the travel ratios are integrated, with a totaled value from routes 1 through 4 being recorded in a total row. The total field indicates how much productivity efficiencies are achieved for the respective settings at a travel ratio of 70 percent. The setting A where the productivity efficiency is the greatest among the settings can be decided as the best setting. Although the productivity efficiencies of the settings A and C are of substantially the same level and it is difficult to tell which is better, a similar table may be produced using other productivity indexes such as the time efficiency (T/h), and the best setting value may be selected form a plurality of tables. In this example, vehicle settings are compared with each other. However, the present embodiment is also applicable to a comparison of parts such as tires, air conditioners, etc., a comparison of driver's driving skills, a comparison of operation command conditions, etc. that affect productivity indexes (T/L), for example.

(Conclusions)

The processing device 202 according to the present embodiment is configured to compute integrated values of travel ratios of respective routes and productivity indexes of respective routes with respect to respective operating conditions (vehicle setting values, parts, drivers, operation command conditions, etc.) of the mine vehicles 101, and output the computed integrated values to the display terminal device 203.

According to the present embodiment thus arranged, operating conditions that contribute most to the improvement of productivity can be selected by comparing integrated values of travel ratios of respective routes and productivity indexes of respective routes with each other with respect to respective operating conditions of mine vehicles 101.

Although the embodiments of the present invention have been described in detail above, the present invention is not limited to the above-described embodiments and may cover various modifications. For example, the above embodiments have been described in detail for an easier understanding of the present invention, and may not necessarily be limited to configurations including all the details described above. Moreover, it is possible to add some of the details of certain embodiments to the details of other embodiments, and to delete some of the details of certain embodiments or replace some of the details of certain embodiments with some of the details of other embodiments.

DESCRIPTION OF REFERENCE CHARACTERS

100: Mine area
101: Mine vehicle
200: Mine management system
201: Database (storage device)

202: Server (processing device)
202*a*: Mesh processing section
202*b*: Route determining section
202*c*: Productivity decline determining section
202*d*: Productivity decline factor separating section
203: Display terminal device
301: Operation administrator
302: Driver guidance instructor
303: Road maintenance worker
304: Vehicle maintenance worker
305: Parts dealer
306: Person in charge of excavation work
400: Internet

The invention claimed is:

1. A mine management system for managing productivity of a mine on a basis of positional information and working information of mine vehicles acquired at a predetermined sampling interval by GPS sensors installed on the mine vehicles and working information of the mine vehicles acquired at the predetermined sampling interval, comprising:

a storage device that stores mesh information of mesh groups, each mesh group being formed of a plurality of meshes of a predetermined mesh size and covering an entirety of each of a plurality of routes around the mine along which the mine vehicles move from a location where earth is dumped to a location where the mine vehicles are loaded with a load and then move again to the earth removing location and also stores productivity reference values of the respective routes;

a processing device that, based on the positional information transmitted from the mine vehicles, generates mesh information of mesh groups formed of a plurality of meshes of the predetermined mesh size and covering an entirety of one travel cycle in which the mine vehicles, after having dumped earth, move to a location where it is loaded with a load and then move again to an earth removing location, the mesh size being determined based on the size of the mine vehicle, its maximum speed, and the predetermined sampling interval; and a display terminal device that displays computed results from the processing device, wherein the mesh groups include meshes based on the positional information of the mine vehicles and adjacent meshes adjacent to the meshes, the mesh information represents inherent IDs uniquely determined by latitude, longitude and the mesh size;

the processing device is configured to:

compute a similarity between the inherent IDs of the mesh group covering an entirety of the one travel cycle and the inherent IDs of the mesh groups stored in the storage device that cover the entirety of the respective routes, and perform a computation to classify the one travel cycle into one of the plurality of routes based on the calculated similarity;

perform a computation to link the working information transmitted from the mine vehicle with the mesh information of the one travel cycle generated from the positional information, and compute productivity indexes of the one travel cycle based on the linked working information, and compare the productivity indexes of the one travel cycle with the productivity reference value of the one of the routes to detect a productivity decline of the one route; and output, as a result of the detected productivity decline detection, a result representing productivity indexes in a past of the one of the routes that have been totaled per driver, per day, per mesh of the route, or per mine vehicle to the display terminal device.

2. The mine management system according to claim 1, wherein the processing device is configured to determine whether or not the travel cycles are classified to the one of the routes, on a basis of a degree of similarity between the mesh information of the travel cycles and the mesh information of the one of the routes.

3. The mine management system according to claim 2, wherein the mesh information of the one of the routes includes information of a first mesh group representing a set of meshes making up the one of the routes and information of a second mesh group representing a set of meshes adjacent to the first mesh group.

4. The mine management system according to claim 1, wherein the productivity indexes include time efficiencies representing load transportation rates per unit time of the mine vehicles and fuel efficiencies representing load transportation rates per unit amount of fuel of the mine vehicles, the storage device stores a proper range for the time efficiencies and the fuel efficiencies as a productivity reference value, and the processing device is configured to, in a case where at least one of the time efficiency and the fuel efficiency on the one of the routes falls out of the proper range, detect a productivity decline on the one of the routes and output a productivity decline factor to the display terminal device.

5. The mine management system according to claim 1, wherein the storage device stores traveled distances and productivity indexes of proper travel cycles in a past, the traveled distances and the productivity indexes having been clustered with respect to respective routes, as productivity reference values, and the processing device is configured to detect a productivity decline on a basis of a distance, from a closest cluster, of data including traveled distances and productivity indexes of travel cycles as targets to be determined for a productivity decline.

6. The mine management system according to claim 1, wherein the processing device is configured to compute integrated values of travel ratios of respective routes and productivity indexes of respective routes with respect to respective operating conditions of the mine vehicles, and output the computed integrated values to the display terminal device.

7. A mine management system for managing productivity of a mine on a basis of positional information and working information of mine vehicles, comprising:

a storage device that stores mesh information of mesh groups each covering an entirety of each of a plurality of routes around the mine along which the mine vehicles move from a location where earth is dumped to a location where the mine vehicles are loaded with a load and then move again to the earth removing location and also stores productivity reference values of the respective routes;

a processing device that generates mesh information of mesh groups each covering an entirety of each of travel cycles in which the mine vehicles, after having dumped earth, move to a location where the mine vehicles are loaded with a load and then move again to an earth removing location, based on the positional information of the mine vehicles; and a display terminal device that displays computed results from the processing device, wherein the mesh groups include meshes based on the positional information of the mine vehicles and adjacent meshes adjacent to the meshes, the mesh information represents the inherent IDs uniquely determined by latitude, longitude and a mesh size, and the processing device is configured to compare the mesh information of mesh groups each covering an entirety of each of the travel cycles with the mesh information of mesh groups each covering an entirety of each of the routes stored in the storage device to classify the travel cycles to any one of the routes, compute productivity indexes of the travel cycles based on the working information of the mine vehicles, and compare the productivity indexes of the travel cycles with the productivity reference value of the one of the routes to detect a productivity decline of the one of the routes, and output the detected productivity decline to the display terminal device thereby informing a user of a decline in the productivity of the travel cycles, and allowing the user to use the detected productivity decline to improve productivity of the travel cycles.

8. The mine management system according to claim 7, wherein the processing device is configured to determine whether or not the travel cycles are classified to the one of the routes, on a basis of a degree of similarity between the mesh information of the travel cycles and the mesh information of the one of the routes.

9. The mine management system according to claim 8, wherein the mesh information of the one of the routes includes information of a first mesh group representing a set of meshes making up the one of the routes and information of a second mesh group representing a set of meshes adjacent to the first mesh group.

10. The mine management system according to claim 7, wherein the processing device is configured to, in a case where the processing device detects a productivity decline of the one of the routes, output to the display terminal device a result representing productivity indexes in a past of the one of the routes that have been totaled per driver, per day, per mesh of the route, or per mine vehicle.

11. The mine management system according to claim 7, wherein the productivity indexes include time efficiencies representing load transportation rates per unit time of the mine vehicles and fuel efficiencies representing load transportation rates per unit amount of fuel of the mine vehicles, the storage device stores a proper range for the time efficiencies and the fuel efficiencies as a productivity reference value, and the processing device is configured to, in a case where at least one of the time efficiency and the fuel efficiency on the one of the routes falls out of the proper range, detect a productivity decline on the one of the routes and output a productivity decline factor to the display terminal device.

12. The mine management system according to claim 7, wherein the storage device stores traveled distances and productivity indexes of proper travel cycles in a past, the traveled distances and the productivity indexes having been clustered with respect to respective routes, as productivity reference values, and the processing device is configured to detect a productivity decline on a basis of a distance, from a closest cluster, of data including traveled distances and productivity indexes of travel cycles as targets to be determined for a productivity decline.

13. The mine management system according to claim 7, wherein the processing device is configured to compute integrated values of travel ratios of respective routes and productivity indexes of respective routes with respect to respective operating conditions of the mine vehicles, and output the computed integrated values to the display terminal device.

14. The mine management system according to claim 1, wherein the display terminal device is configured to display, together with the productivity indexes, a history of changes in a parameter representing a productivity decline factor, the parameter including at least one of a deceleration count, an idle time, or a power train efficiency.

* * * * *